(12) United States Patent
Gibson

(10) Patent No.: US 9,585,365 B1
(45) Date of Patent: Mar. 7, 2017

(54) ADJUSTABLE PROTECTIVE ANIMAL COLLAR

(71) Applicant: CSTECH US, Las Vegas, NV (US)

(72) Inventor: Chad Gibson, Carlsbad, CA (US)

(73) Assignee: CSTECH US, Las Vegas, NV (US)

( * ) Notice: Subject to any disclaimer, the term of this patent is extended or adjusted under 35 U.S.C. 154(b) by 0 days.

(21) Appl. No.: 15/260,808

(22) Filed: Sep. 9, 2016

Related U.S. Application Data

(63) Continuation of application No. PCT/US2016/028514, filed on Apr. 20, 2016.

(60) Provisional application No. 62/220,844, filed on Sep. 18, 2015, provisional application No. 62/222,101, filed on Sep. 22, 2015.

(51) Int. Cl.
*A01K 27/00* (2006.01)
*A01K 13/00* (2006.01)

(52) U.S. Cl.
CPC .......... *A01K 13/006* (2013.01); *A01K 27/001* (2013.01)

(58) Field of Classification Search
CPC .. A01K 13/006; A01K 27/001; A01K 15/006; A01K 15/04; A01K 27/00; A01K 29/00
USPC ........ 119/814, 815, 837, 850, 856, 855, 821
See application file for complete search history.

(56) References Cited

U.S. PATENT DOCUMENTS

| | | | |
|---|---|---|---|
| 3,036,554 A * | 5/1962 | Johnson ................... | A61D 9/00 119/815 |
| 4,200,057 A * | 4/1980 | Agar ....................... | A01K 15/04 119/815 |
| 5,012,764 A * | 5/1991 | Fick ....................... | A01K 13/006 119/821 |
| 5,197,414 A * | 3/1993 | Kanakura .............. | A01K 27/00 119/815 |
| 5,797,354 A * | 8/1998 | Marschall ............ | A01K 13/006 119/815 |
| D562,505 S * | 2/2008 | Fujita ......................... | D30/152 |
| 7,765,957 B2 * | 8/2010 | Behravesh ........... | A01K 13/006 119/815 |
| 8,042,494 B2 * | 10/2011 | Markfield ............ | A01K 13/006 119/815 |
| 8,181,609 B2 * | 5/2012 | Ohashi ................. | A01K 13/006 119/815 |
| D673,739 S * | 1/2013 | Herrera ........................ | D30/145 |
| 8,720,386 B2 * | 5/2014 | Markfield ............ | A01K 13/006 119/815 |
| 8,739,741 B2 * | 6/2014 | Groff ................... | A01K 13/006 119/815 |
| 2009/0241855 A1* | 10/2009 | Stocki ..................... | A61D 9/00 119/815 |

(Continued)

OTHER PUBLICATIONS

International Searching Authority, International Search Report for International Application No. PCT/US2016/028514, mailed Aug. 29, 2016, 4 pages.

(Continued)

*Primary Examiner* — Yvonne Abbott-Lewis
(74) *Attorney, Agent, or Firm* — Gordon Rees Scully Manusukhani LLP; Reid E. Dammann

(57) ABSTRACT

The present disclosure relates to a protective animal collar having clear panels to increase a visibility of the wearer. When unassembled, the collar is roughly fan shaped. When assembled, the collar is roughly frustoconical in shape. The collar is lightweight and adjustable. The collar is easy to assemble and can be folded for storage.

19 Claims, 9 Drawing Sheets

(56) References Cited

U.S. PATENT DOCUMENTS

| | | | |
|---|---|---|---|
| 2011/0277701 A1* | 11/2011 | King | A61D 9/00 119/815 |
| 2013/0074784 A1* | 3/2013 | Briggs | A01K 13/006 119/815 |
| 2015/0053147 A1 | 2/2015 | Lippincott | |

OTHER PUBLICATIONS

International Searching Authority, Written Opinion for International Application No. PCT/US2016/028514, mailed Aug. 29, 2016, 6 pages.

\* cited by examiner

ADJUSTABLE PROTECTIVE ANIMAL COLLAR

CROSS-REFERENCE TO RELATED APPLICATIONS

This application is a continuation of international application no. PCT/US16/28514, filed on Apr. 20, 2016, claiming the benefit of U.S. provisional application No. 62/220,844, filed on Sep. 18, 2015 and also claiming the benefit of U.S. provisional application No. 62/222,101 filed on Sep. 22, 2015. This application also claims the benefit of U.S. provisional application No. 62/220,844, filed on Sep. 18, 2015 and also claims the benefit of U.S. provisional application No. 62/222,101 filed on Sep. 22, 2015. The contents of all related applications are incorporated by reference in their entirety herein.

TECHNICAL FIELD

The present disclosure relates to protective animal collars having clear panels to increase visibility for the wearer. The collars are roughly frustoconical in shape and are lightweight and adjustable. The collars are easy to assemble and can be folded for storage.

BACKGROUND

Protective animal collars, commonly referred to as Elizabethan collars, e-collars, pet cone, lamp-shade, or cone of shame, are roughly frustoconical in shape and designed to be worn around an animal's neck with the collar extending upward and outward around the animal's head. The collars are generally used to prevent an animal from licking or biting a wounded or diseased area on the animal's body. They can also be used to protect an animal's head or neck from scratching or rubbing with the paws.

Protective animal collars are commonly used after an animal has undergone a surgical procedure to prevent the animal from further aggravating the surgical site or disrupting the sutures and to decrease the risk of infection due to continued irritation of the site. However, they can also be used to prevent an animal from licking topically applied products such as medication or to prevent an animal from over-grooming.

Typically protective animal collars are made from flexible but fairly rigid material such as plastic or cardboard. The rigidity of the material prevents the animal from accessing the wounded or diseased area on its body with the more rigid materials doing a better job of keeping the head isolated. However, the rigidity of the material tends to negatively correlate with the animal's comfort in wearing the collar. Increasing rigidity also tends to increase the weight of the collar, which in turn increases the chaffing on the wearer. Also, the more rigid the material, the more difficulty the animal has moving around and the more jarring for the animal if it runs into an object. Additionally, the more rigid the material, the more damage that occurs to furniture, walls, and/or people if the animal runs into them. Furthermore, the more rigid the material, the less likely the protective collar can be collapsed for storage. Lastly, the protective animal collars block the wearer's vision causing the animal to run into things. Accordingly, there is a need for a protective animal collar that is functional and comfortable for the wearer.

DETAILED DESCRIPTION

Figure 1:
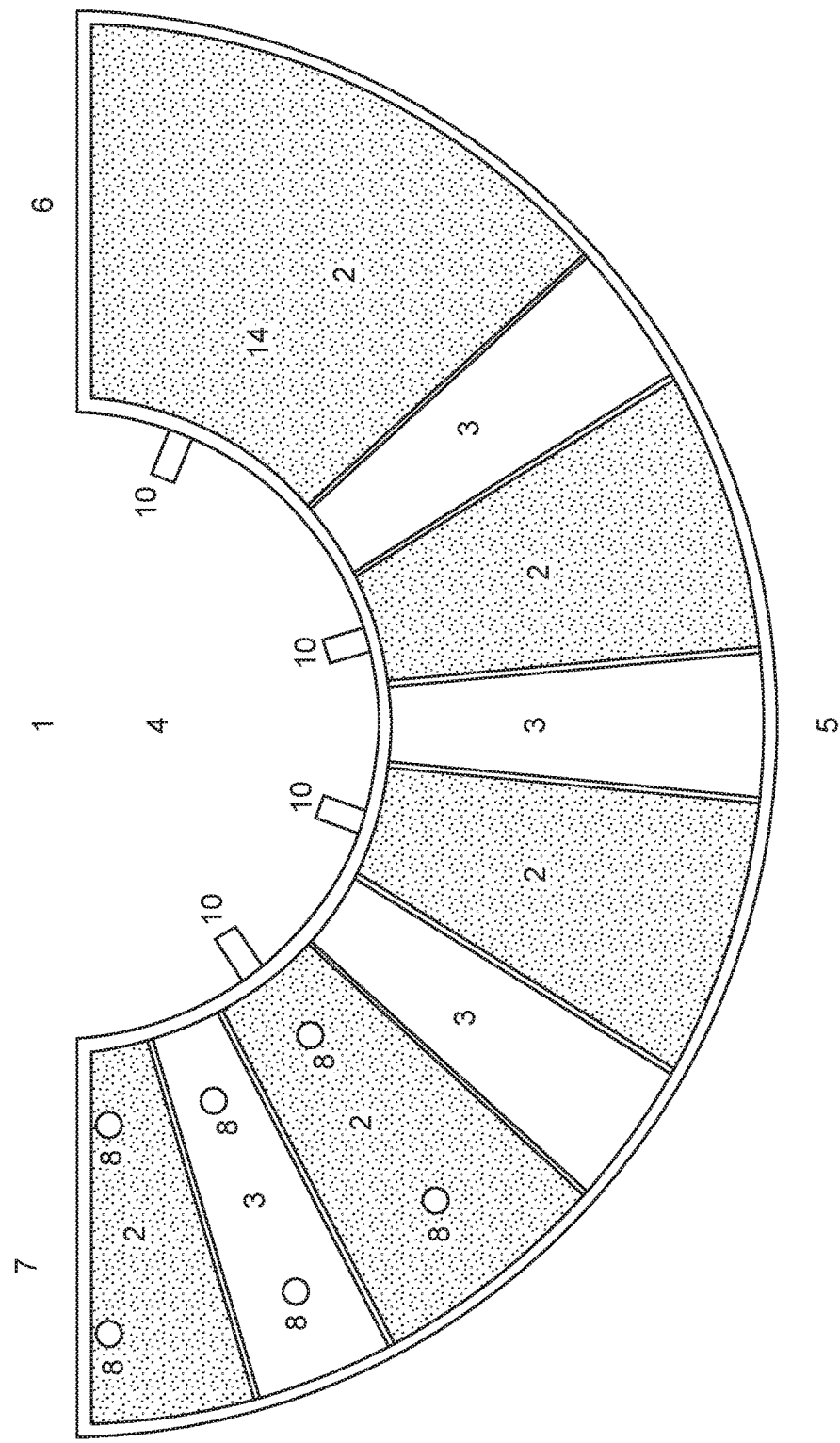
FIG. 1 illustrates a top view of a non-limiting embodiment of the protective collar in a flat unassembled state.

The disclosure described herein generally relates to protective animal collars, herein referred to as "protective collars". Protective collars are used to prevent an animal from instinctively licking, biting, scratching, or generally further aggravating a wound, rash, or other malady the animal has. Specifically, the protective collars described herein are lightweight, comfortable, and have improved visibility of the wearer while still functioning to restrain the animal's movement. Furthermore, the protective animal collars of the present disclosure are easy to wash and fold down for storage. The protective collars can be made to fit just about any animal. Often, the collar is sized to fit common household pets such as dogs, cats, rabbits, small pigs, and the like.

The disclosure described herein references the figures wherein the reference numbers indicate identical or functionally similar elements. While specific configurations and arrangements are discussed, it should be understood that this is done for illustrative purposes only and is in no way intended to limit the scope of the disclosure. Additional configurations and arrangements can be used without departing from the spirit and scope of the disclosure.

Unless defined otherwise, the technical terms used in the present disclosure have the same meaning as is commonly understood by one of ordinary skill in the art to which this disclosure belongs. The following non-limiting definitions provide a clear and consistent understanding of the specification and claims, including the non-limiting exemplary scope to be given such terms.

The terms "one," "a," or "an" are used in this disclosure refer to "at least one" or "one or more," unless otherwise indicated.

The term "standard pet collar" or "identification collar" as used herein refers to a collar worn by a household animal or pet. Such collars can be attached to a leash. Often such collars include animal identification information and/or owner contact information.

The terms "fan shaped" or "two dimensional" are used interchangeably and unless otherwise defined refer to a protective collar in an unassembled, flat shape.

The term "frustoconical" as used herein refers to a three dimensional shape similar to a cone or pyramid with the tip cut off. The term includes similar conical or pyramidal shapes having 3, 4, 5, 6, 7, 8, or more sides.

The term "frustoconical" or "three dimensional" are used interchangeably and unless otherwise defined refer to the protective collar in an assembled, ready to use state.

The term "panel" as used herein refers to an individual section of a multi-section or multi-panel arrangement. The panels can vary in width, but generally have the same overall length. The panels generally delineate sections of the protective animal collar. The panels can be made of the same of different materials.

The term "alternating configuration" as used herein refers to the use of at least two different panels wherein identical panels are not adjacent. Non-limiting examples include a panel 1, panel 2, panel 1, panel 2, etc. configuration or a panel 1, panel 2, panel 3, panel 1, panel 2, panel 3, etc. configuration or a panel 1, panel 2, panel 3, panel 2, panel 1, etc. configuration or a panel 1, panel 2, panel 3, panel 2, panel 3, panel 2, panel 1, etc. configuration.

The term "support rib" as used herein refers to a narrow strip of material whose main purpose is to help maintain a given shape. Support ribs generally have a length that is longer than the width. Support ribs can be made of many different materials. Non-limiting examples include plastic, heavy or stiff fabric-like material, fiberglass, wood, bone, and the like.

Figure 2:
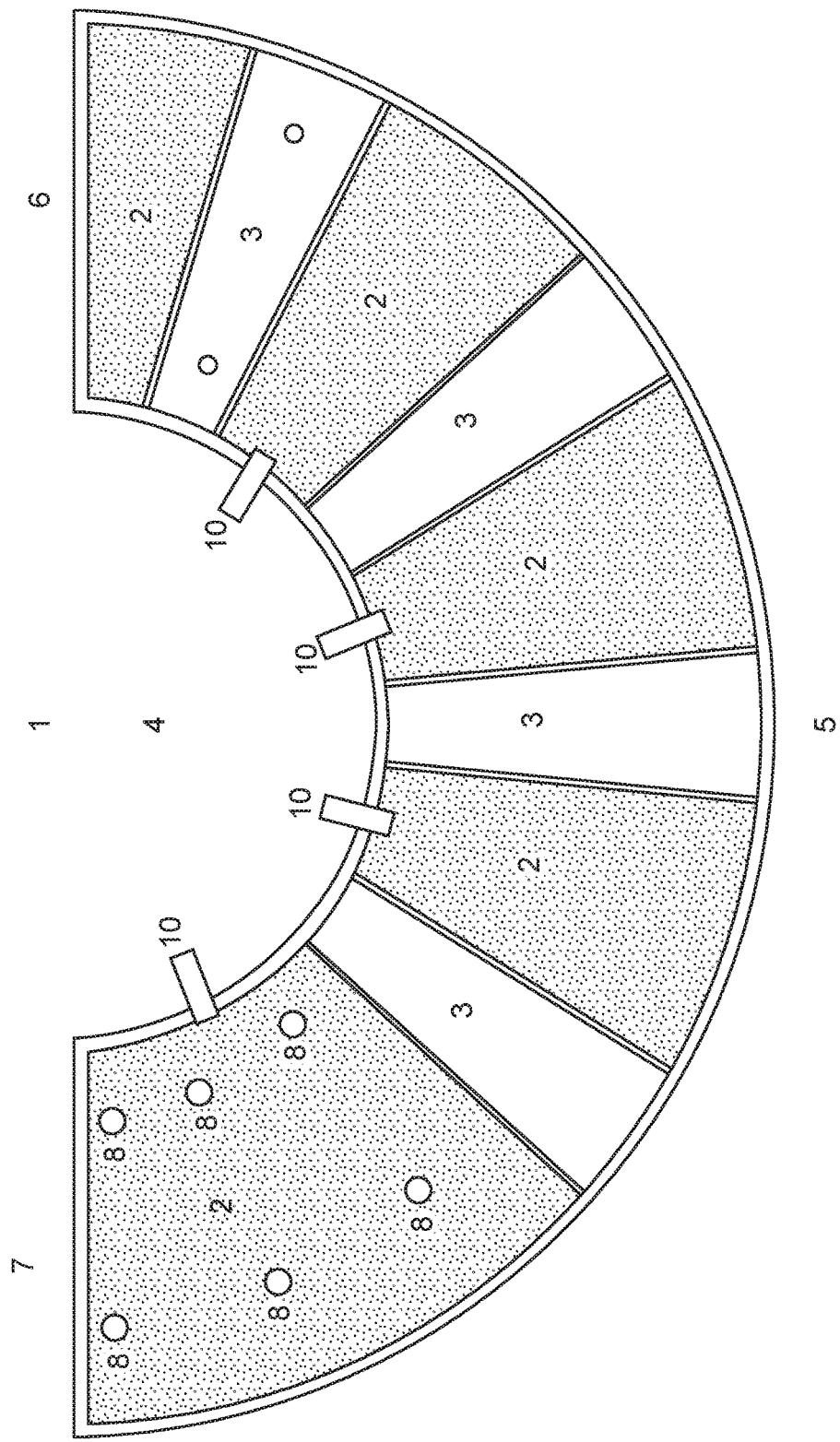
FIG. 2 illustrates a bottom view of a non-limiting embodiment of the protective collar in a flat unassembled state.

Referring to FIG. 1 and FIG. 2, the protective collar (1) is a multi-panel design using at least two different materials for the panels (2, 3). The protective collar (1) is fan-shaped when unassembled and laid flat (i.e. two dimensional) with the panels (2, 3) being roughly trapezoidal shaped. The individual panels have the same length as measured from a top edge (4) to a bottom edge (5). The width of the individual panels is the distance between neighboring panels. The width of the individual panels can be different or the same. The panel material should be stiff to maintain the shape and flexible to allow the protective collar to be folded for storage. Non-limiting examples of materials for the panels include canvas, denim, composite fabrics (e.g. Gore-Tex® fabric), upholstery fabrics, synthetic fabrics, plastic, silicone, rubber, mesh, arcel, polyethylene, polypro, polypropylene, and the like.

In one embodiment, at least one of the panels (2, 3) is transparent or tinted. In another embodiment, at least two or three or four or five of the panels are transparent or tinted. The transparent or tinted panel(s) allows greater visibility for the animal wearing the collar. In another embodiment, at least one of the panels (2, 3) is mesh. In another embodiment, the at least two or three or four or five of the panels are mesh. The mesh panel(s) allow for greater air flow for the wearer. In one embodiment, the protective collar includes both transparent and mesh panels. In one embodiment, at least one panel is made from a stiffer material than other panels such that the stiffer panels provide rigidity to allow other panels to be made from less stiff material. In another embodiment, the transparent material is the stiffer material.

In one embodiment, the panels (2, 3) are made of a single layer of material. In another embodiment, at least one panel or the panels are made of multiple layers of material. In another embodiment, the multilayer panel is made of at least two or at least three or at least four or at least five layers of materials. In another embodiment, a single material is used for the multiple layers. In another embodiment, different materials are used for multiple layers. In another embodiment, the different materials for the different layers includes less stiff material such as interfacing, fusing, and the like.

Referring to FIGS. 1 and 2, the protective collar (1) has a top edge (4), a bottom edge (5), a first end (6), and a second end (7). The top edge is designed to surround the wearer's neck when in the assembled state (i.e. three dimensional). The bottom edge projects upward and outward from the top edge to surround the wearer's head. The first end (6) is designed to attach to the second end (7) to create an assembled three dimensional frustoconical shape.

In one embodiment, the top edge has at least one loop (10) attached to it. In another embodiment, the top edge has at least two, or three, or four, or five, or six, loops attached to it. In one embodiment, the loops are a fixed size. In another embodiment, the loops are adjustable. In another embodiment, the loops are two strips that can be connected to form a loop. In another embodiment, the loops are a long strip that attaches back on itself to form a loop. When the using the two strips or one long strip embodiments, non-limiting ways to attach the strips include snaps, hook and loop, buttons, and the like. When using two strips, the strips can be tied together. In one embodiment, the loops are large enough to allow an animal's identification collar to pass through.

In another embodiment (not depicted), the top edge has a band extending the length of the top edge attached to it. The band can increase the comfort and/or reduce chafing for the wearer. In one embodiment, the band extends half an inch from the top edge. In another embodiment, the band extends 1 inch or 1.5 inches or two inches from the top edge. In another embodiment, both loops and a band extend from the top edge. The band can increase the comfort of the collar for wearer.

In one embodiment, the first end (6) and second end (7) include at least one closing mechanism. The closing mechanism (8, 9) is used to connect the first end to the second end to create a three dimensional frustoconical shaped device. In one embodiment, the closing mechanism is adjustable and allows for at least one protective collar size. In another embodiment, the closing mechanism allows for at least two or three or four or five different sizes as shown in FIGS. 1, 2, 4, and 5.

Figure 4:
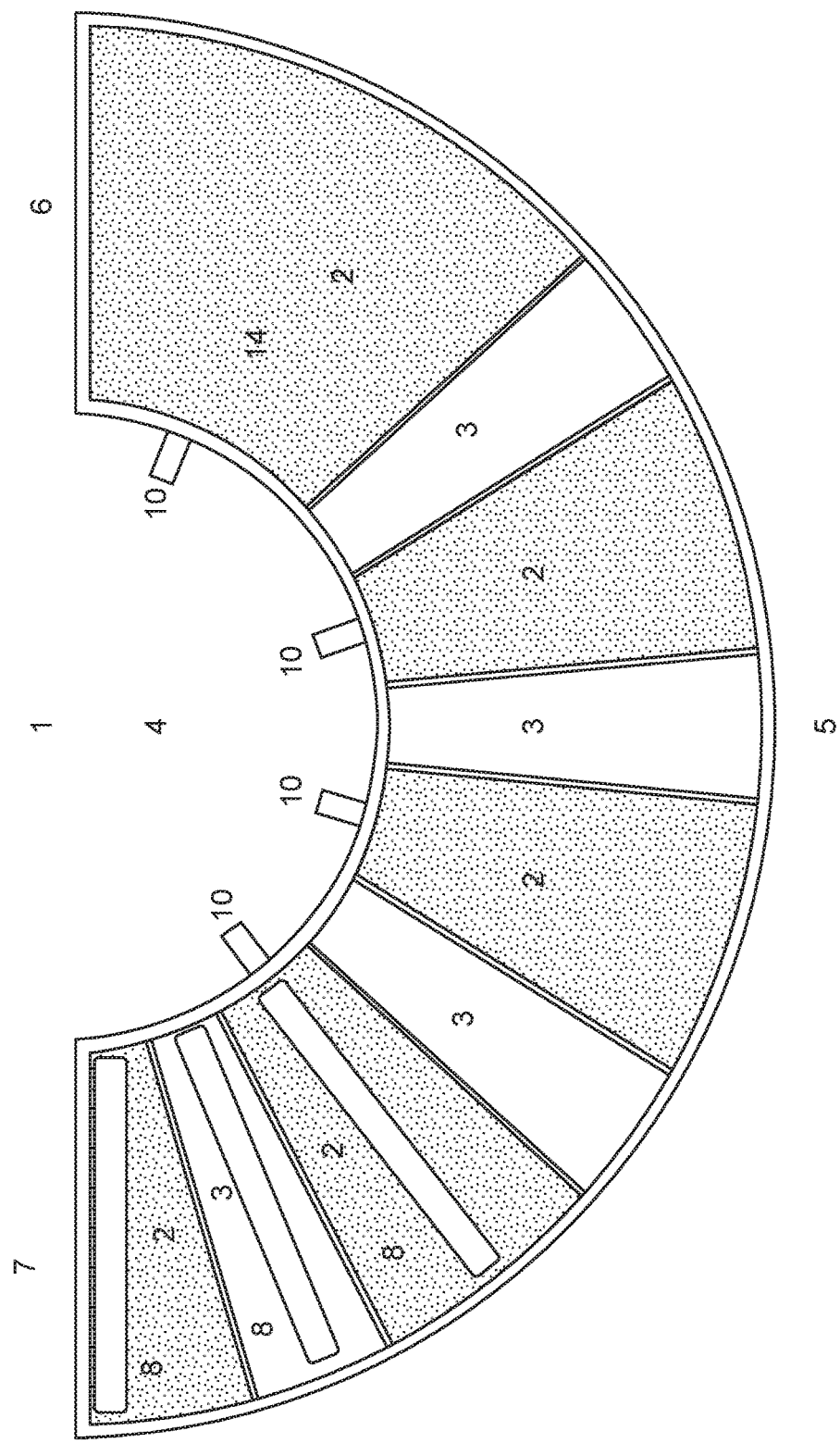
FIG. 4 illustrates a top view of a non-limiting embodiment of the protective collar in a flat unassembled state.
Figure 5:
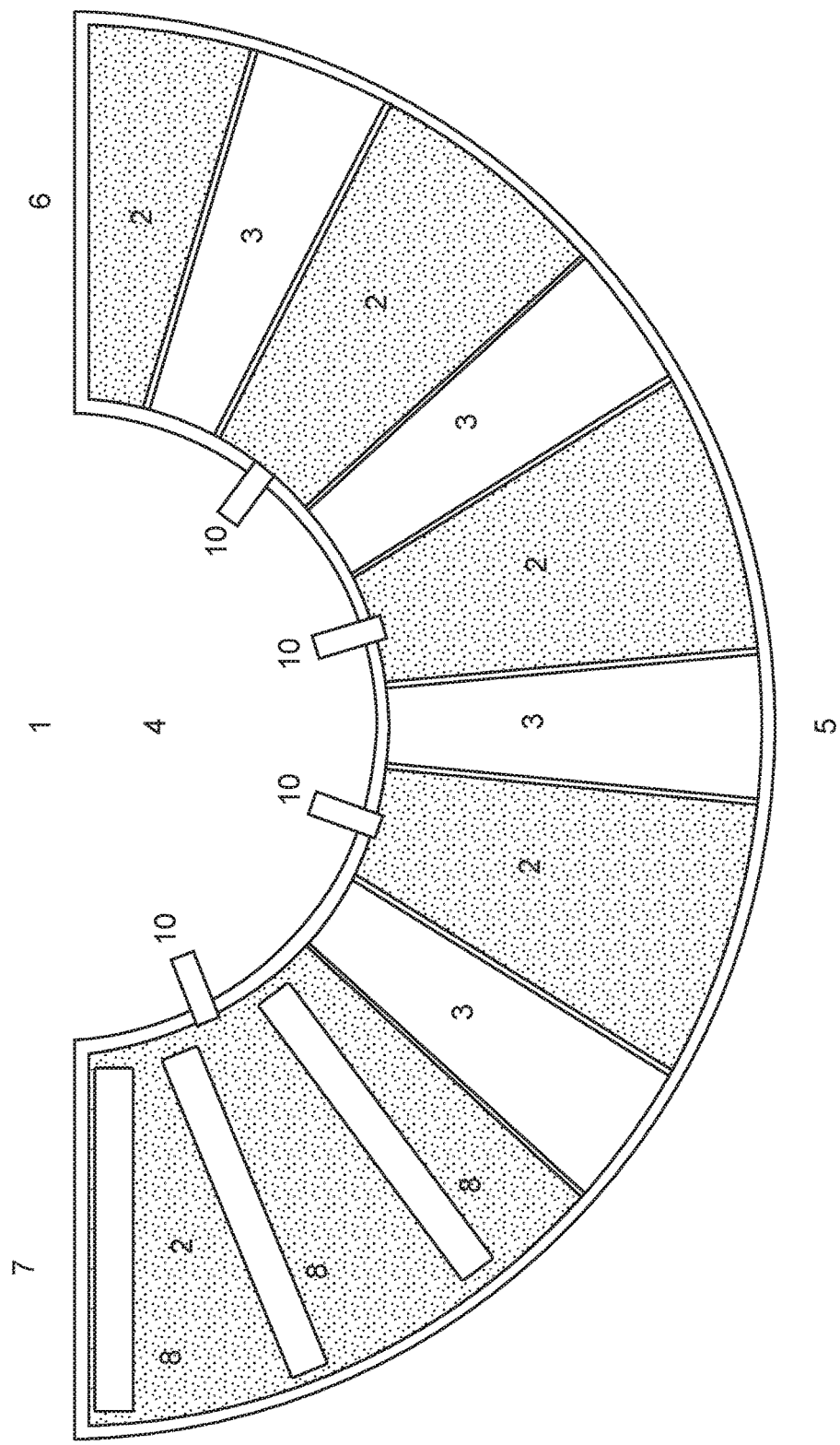
FIG. 5 illustrates a bottom view of a non-limiting embodiment of the protective collar in a flat unassembled state.
Figure 6:
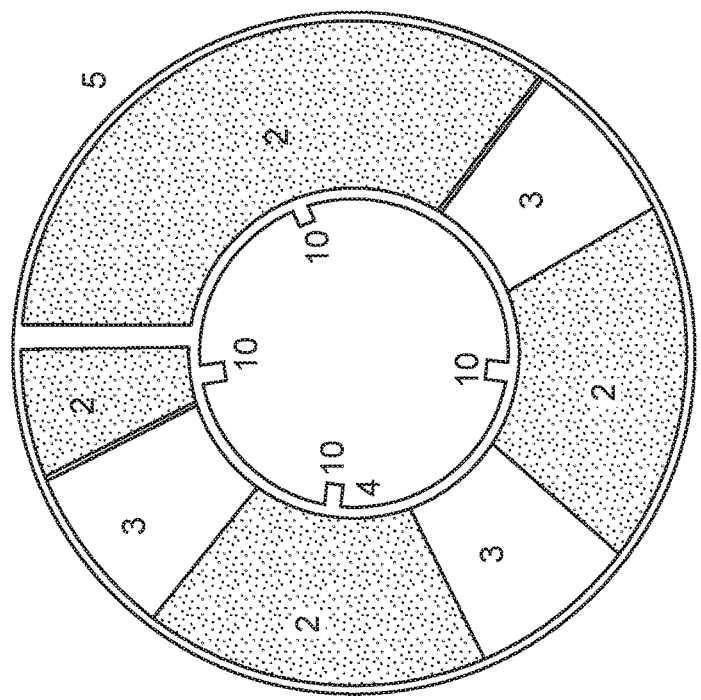
FIG. 6 illustrates a perspective view of a non-limiting embodiment of the protective collar in an assembled state.
Figure 7:
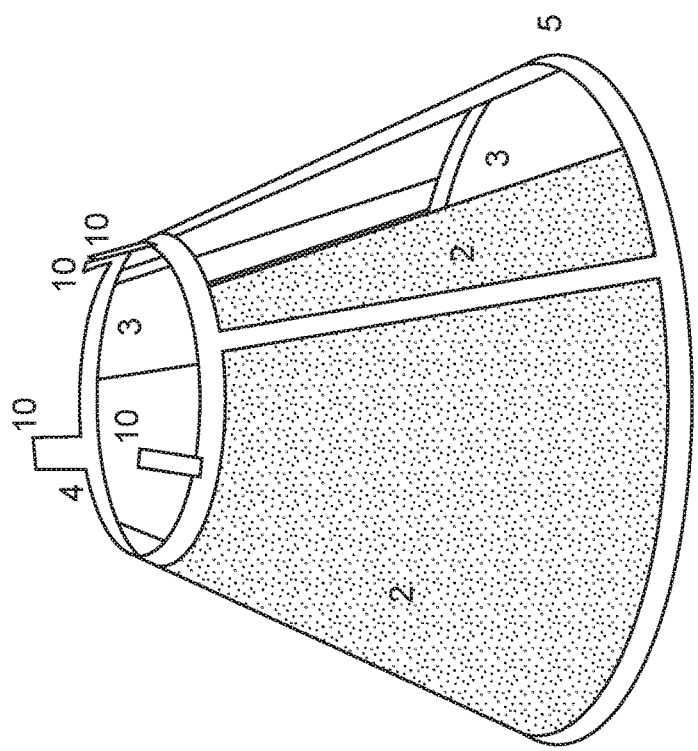
FIG. 7 illustrates a top view of a non-limiting embodiment of the protective collar in an assembled state.
Figure 9:
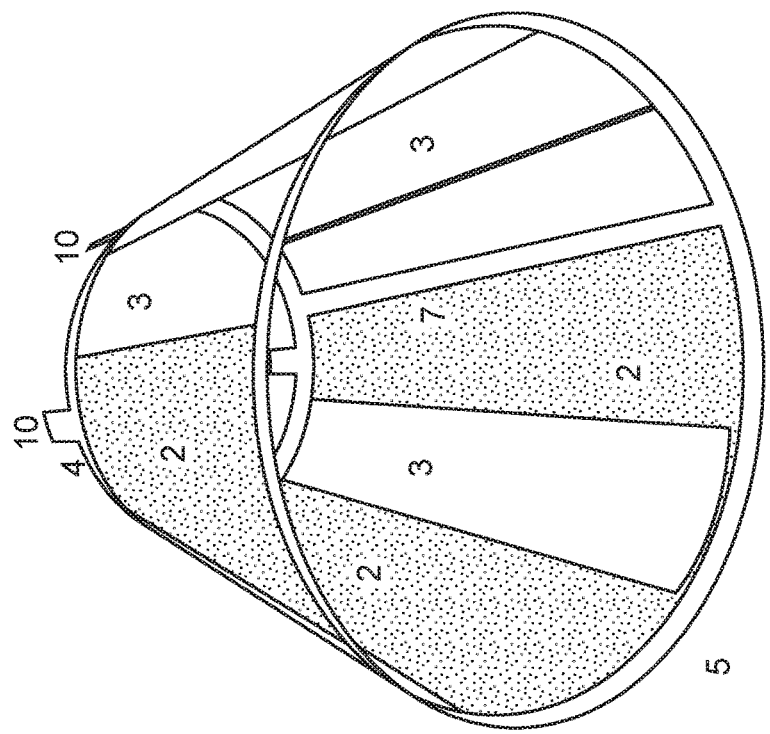
FIG. 9 illustrates a perspective view of a non-limiting embodiment of the protective collar in an assembled state.
Figure 8:
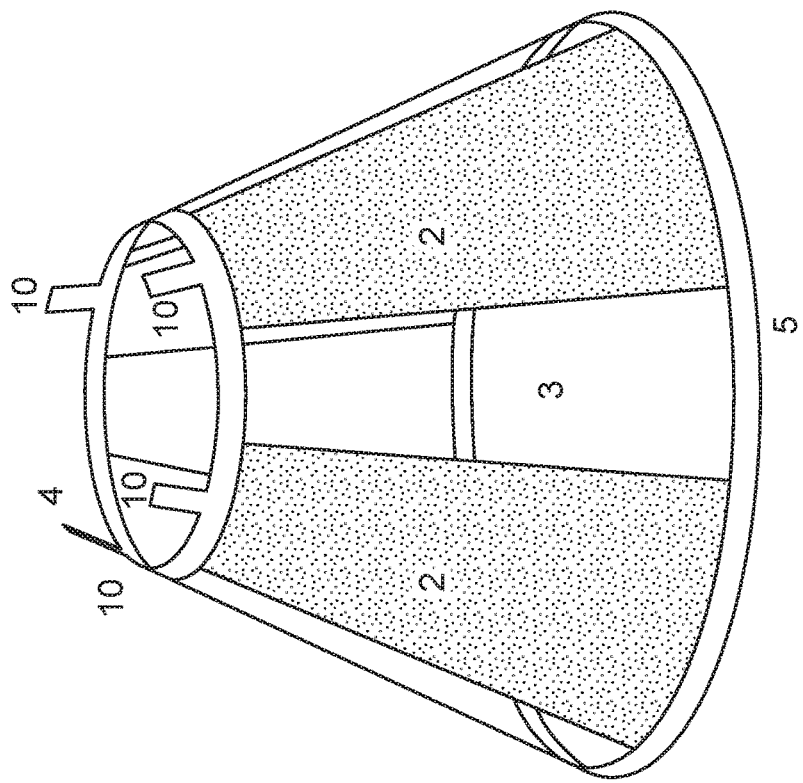
FIG. 8 illustrates a perspective view of a non-limiting embodiment of the protective collar in an assembled state.
Figure 10:
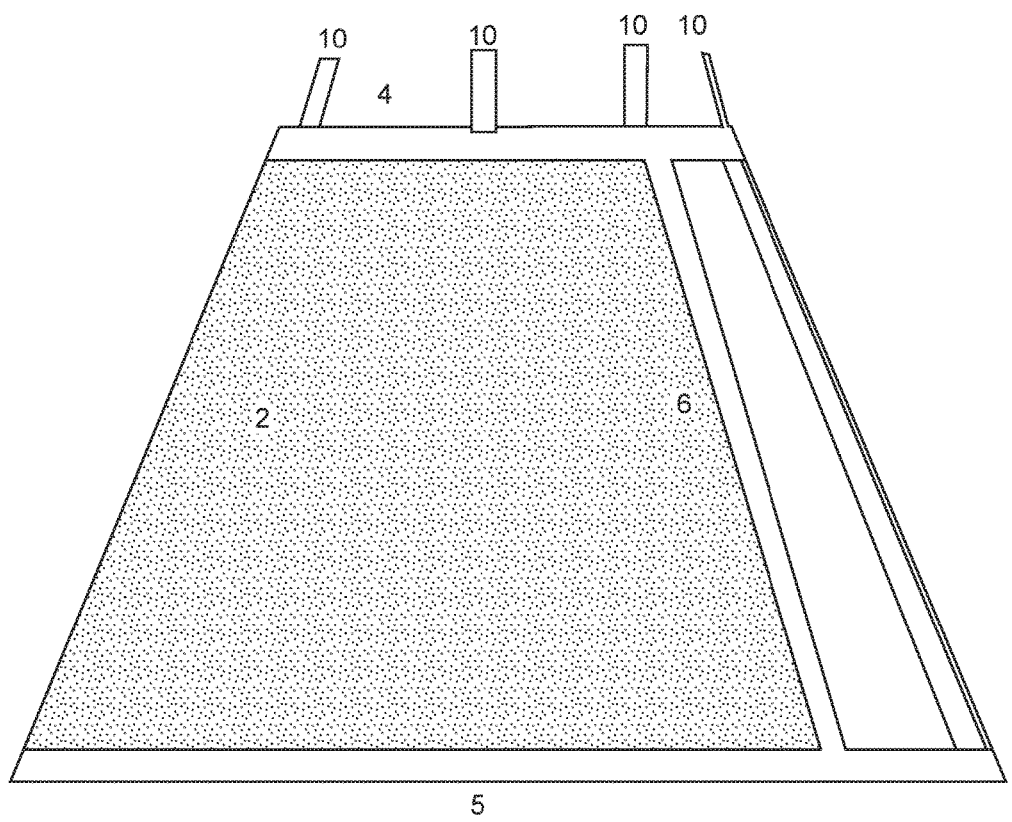
FIG. 10 illustrates a side view of a non-limiting embodiment of the prospective collar in an assembled state.
Figure 12:
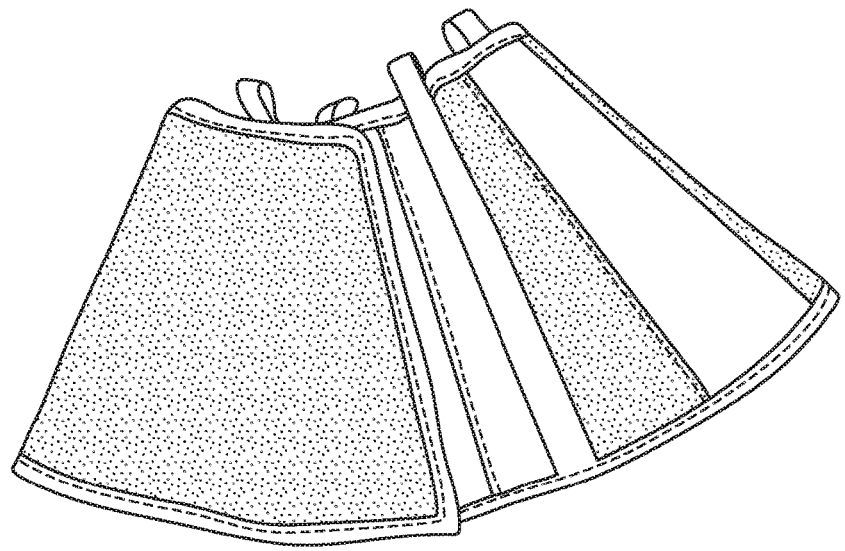
FIG. 12 illustrates a side view of a non-limiting embodiment of the protective collar in a folded state.
Figure 11:
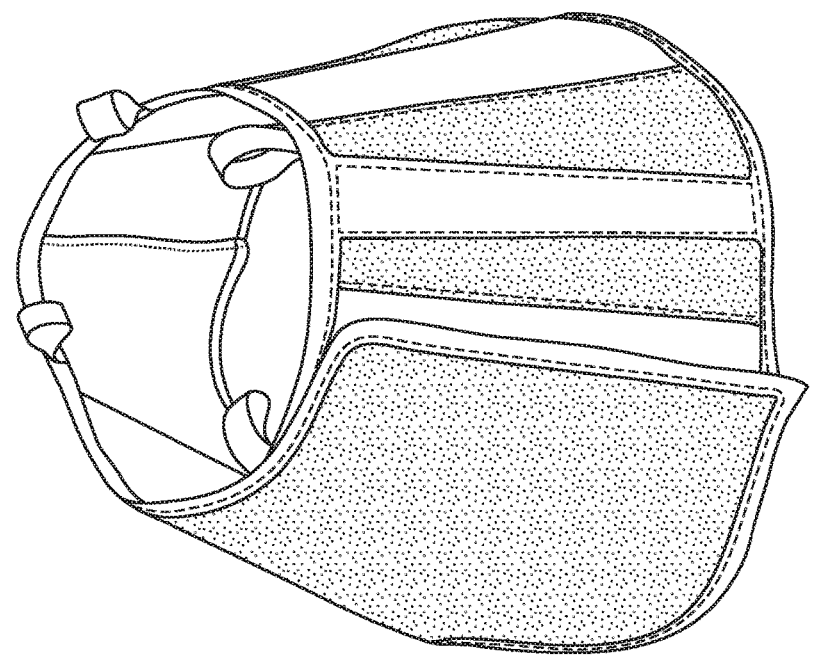
FIG. 11 illustrates a perspective view of a non-limiting embodiment of the protective collar in an assembled state.

The closing mechanism can be a variety of different mechanisms. Non-limiting closing mechanisms include hook and loop (single and Velcro® fastener), snaps, zippers, frogs, hook and eye, clips, buttons, buckles, quick release buckles, and the like. In one embodiment, the attachment mechanism is a single strip of Velcro® fastener that covers at least half of the length of the protective collar from the top edge to the bottom edge for each size (FIGS. 4 and 5, elements 8, and 9). In another embodiment, the closing mechanism is a zipper that runs the length of the protective collar from the top edge to the bottom edge for each size. In this embodiment, often one side of the zipper is attached to either end (e.g. 6) while multiple mating sides are attached to the other end (e.g. 7). In another embodiment, the closing mechanism has at least two separate attachment points per each size as shown in FIGS. 1 and 2, elements 8 and 9. For example, at least two spots of Velcro® fastener or at least two snaps or at least two frogs or at least two hook and loops, and the like. In another embodiment, the closing mechanism is at least three or at least four or at least five separate attachment points per each size. In another embodiment, the closing mechanism is at least one quick release clip or buckle that has adjustable straps to allow for a variety of sizes. Referring to FIG. 1 and FIG. 2, in one embodiment, the closing mechanisms are on opposite top and bottom sides such that one half of the attachment mechanism (e.g. 8) is viewable when looking from the top of the protective collar in its unassembled state and the other half of the attachment mechanism (e.g. 9) is viewable when looking from the bottom of the protective collar in its unassembled state.

Figure 3:
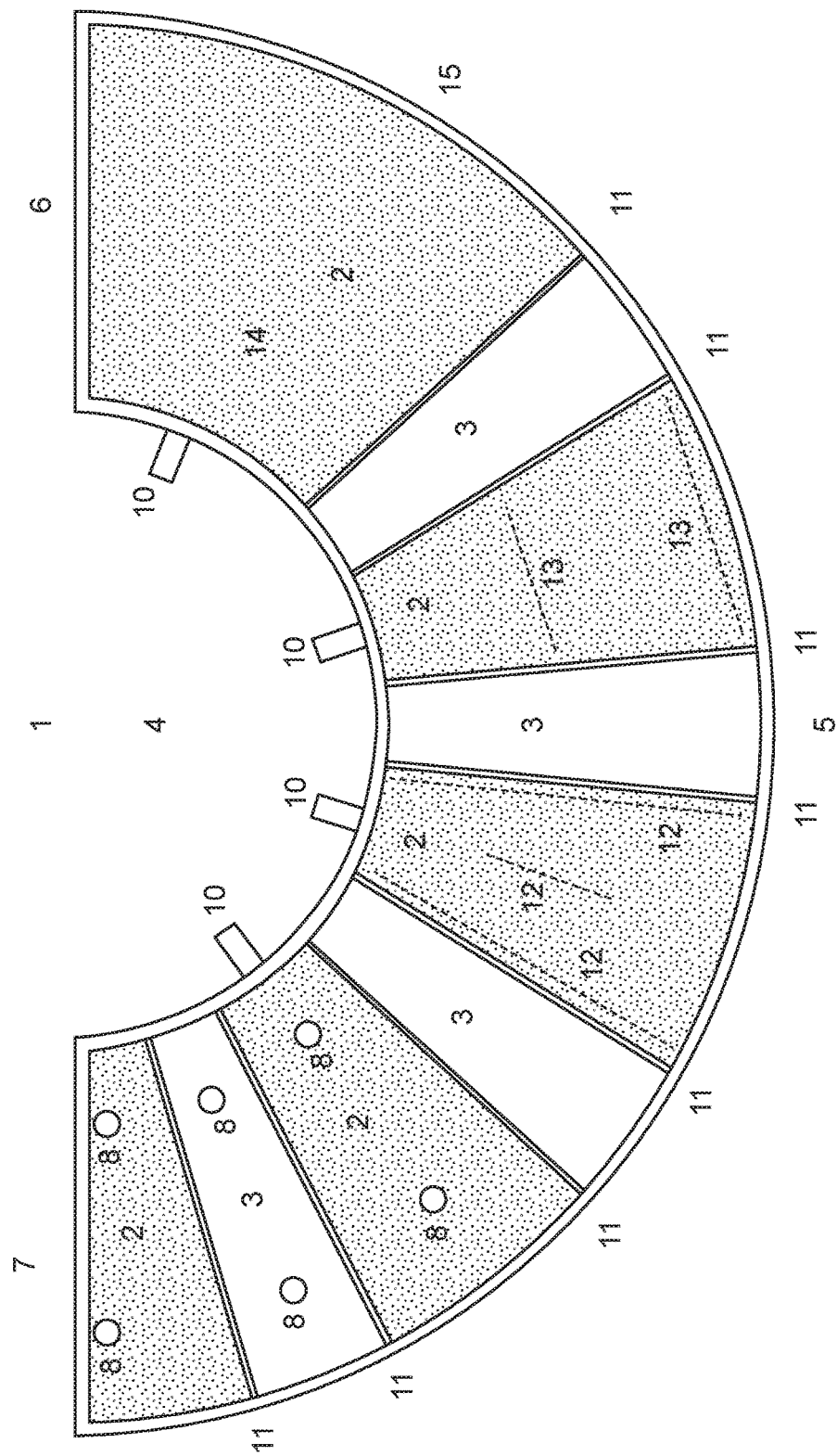
FIG. 3 illustrates a top view of a non-limiting embodiment of the protective collar in a flat unassembled state.

Plastic protective collars use the rigidity of the plastic to maintain a frustoconical shape. When using lighter, flexible materials, it may be necessary to use various techniques to improve structural support. Non-limiting methods include using various sewing techniques such as piping, hemming, and stays. Alternatively separate supports including but not limited to tapes, stays, and support ribs (collectively referred to as "support ribs") can be used to help maintain the frustoconical shape, especially with the larger sized collars. Referring to FIG. 3, in one embodiment, the support ribs run perpendicular to the top edge and bottom edge as exemplified by the dashed lines (12). In this embodiment, the support ribs are at least half the length as measured from the top edge (4) to the bottom edge (5). In this embodiment, the rib can be placed anywhere in the panels such as in the center or along a seam where one panel attaches to another panel. In another embodiment, the support rib is embedded in the seam where one panel attaches to another panel. In another embodiment, the support ribs run parallel with the top edge and bottom edge as exemplified by the dashed lines (13). In this embodiment, the support rib is shorter than the width of the panel. In this embodiment, the rib can be placed anywhere in the panel, such as in the center of the panel or along the bottom edge of the panel. Support ribs can be made of many different materials with varying degrees of flexibility. Non-limiting examples of support rib materials include plastic, heavy or stiff fabric-like material, fiberglass, bone, wood, and the like. In one embodiment, the panel has multiple layers and the support rib is secured between the layers. In another embodiment the support rib is secured in the area where the panels attach to each other (element 11).

Optionally, the protective collars can include a label (14) to help orient a user in attaching the protective collar on the wearer.

In general, the protective collar is made from lightweight materials that have some flexibility. Non limiting examples of materials for the panels include canvass, composite fabrics, denim, upholstery fabrics, transparent plastics, rubber, mesh, and the like. The panels may be permanently or non-permanently attached to each other (as represented by element 11). Permanent methods include stitching, gluing, fusing, high frequency welding, double sided tape, and the like. Non-permanent methods include hook and loop (e.g. Velcro® fasteners), removable double sided tape (e.g. 3M Command™ strips) and the like. Using non-permanent attachment methods would allow an end user to swap out panels, for example, to change the color or to replace a transparent panel if the panel becomes cloudy.

In one embodiment, the panel can be a single layer of material. In another embodiment, the panels can be multilayer. In another embodiment, the panel can be two or more layers of material. In another embodiment, the panel can be three or more layers of material. In another embodiment, the multiple layers can be of the same material. In another embodiment, the multiple layers can be two or more different materials. In another embodiment, the multiple layers can be three or more different materials. In another embodiment, the multiple layers can be four or more different materials. In one embodiment, the multiple layers can include interfacing or similar material to stiffen or strengthen the panel. In another embodiment, the multiple layers can be used to secure support ribs.

In one embodiment, the top edge, bottom edge, first end and second end are finished with a border (15). In one embodiment, the border helps prevent fraying of the panels. In another embodiment, the border increases wearer comfort. Non-limiting examples of border materials include nylon webbing, reflective tape, fusible edging, bias tape, and the like.

The protective collar is designed for repeated use. Accordingly, the protective collar should be collapsible or foldable to allow for easy, compact storage. In one embodiment, the protective collar is made from a material that is collapsible or foldable in an unassembled state but will maintain its shape when assembled. In another embodiment, the inclusion of support ribs still allows the protective collar to be folded. In another embodiment, the protective collar is stored in a storage container to protect and keep the collar clean.

In one embodiment, the protective collar is made from a material that is easy to clean and/or resists staining. In another embodiment, the material is machine washable. In another embodiment, the material is a rapid drying material.

The present disclosure can be used for a variety of different purposes. Non-limiting examples include preventing licking or biting a wound or diseased area, preventing licking off a topically applied medicine, preventing rubbing or irritating of a head area, preventing over-grooming, aiding in behavior control, and preventing or reducing the impact of an animal bite.

The following paragraphs provide further non-limiting exemplary embodiments of the disclosure.

In one embodiment a protective animal collar comprises: (a) a two dimensional fan-shaped multi-panel array comprising: (1) at least one first panel comprising at least one layer of a first material; (2) at least one second panel comprising at least one layer of a second material; (3) a top edge; (4) a bottom edge; (5) a first end; and (6) a second end; and (b) at least one closing mechanism; wherein the at least one first panel and at least one second panel are adjacent to each other; wherein the at least one first panel and the at least one second panel have a length that extends from the top edge to the bottom edge; wherein the first material is either transparent or non-transparent and the second material transparent or tinted; wherein the top edge is shorter than the bottom edge; wherein the closure attaches the first end to the second end; and wherein attachment of the first end to the second end forms a three dimensional frustoconical structure. In another embodiment, the protective animal collar further comprises at least two second panels. In another embodiment, the at least two second panels are separated by a first panel. In another embodiment, the at least two second panels are positioned to be on opposite sides when the first end and second end are attached. In another embodiment, the protective animal collar further comprises at least three second panels. In another embodiment, the protective animal collar further comprises at least two first panels; wherein the at least two first panels separate the at least three second panels. In another embodiment, the at least three second panels are positioned such that two of the three panels are on opposite sides when the first end and second end are attached.

In another embodiment, the first panel further comprises at least two layers of the first material. In another embodiment, the first panel further comprises at least one layer of the first material and at least one layer of a third material. In another embodiment, the first panel further comprises at least one layer of the first material, at least one layer of a third material, and at least one layer of a fourth material.

In another embodiment, the first panel and second panel are in an alternate configuration. In another embodiment, the alternate configuration is first panel, second panel, first panel, second panel, etc.

In another embodiment, the first, second, third, or fourth material is selected from the group consisting of a canvas, a denim, upholstery fabric, a composite fabric, a synthetic fabrics, a plastic, a rubber, a reflective material, a silicone, an arcel, a polyethylene, a polypro, a polypropylene, and a mesh. In another embodiment, the second material is selected from the group consisting of a plastic, an arcel, a polyethylene, a polypro, a polypropylene, and a rubber. In another embodiment, the first material is canvas and the second material is transparent plastic. In another embodiment, the first material is mesh and the second material is transparent plastic. In another embodiment, the first material is composite fabric and the second material is transparent plastic. In another embodiment, the first material is reflective and the second material is transparent.

In another embodiment, the at least one first panel and the at least one second panel are glued together. In another embodiment, the at least one first panel and the at least one second panel are sewn together. In another embodiment, the at least one first panel and the at least one second panel are high frequency welded together. In another embodiment, the at least one first panel and the at least one second panel are taped together. In another embodiment, the at least one first panel and the at least one second panel are held together using a fastening mechanism. In another embodiment, the fastening mechanism is selected from the group consisting of a hook and loop, a snap, a zipper, and a hook and eye closure.

In another embodiment, the protective animal collar further comprises multiple closing mechanisms; wherein the multiple closing mechanisms are arranged to allow for more than one size when assembled in the three dimensional frustoconical structure. In another embodiment, the at least one closing mechanism is selected from the group consisting of a hook and loop, a snap, a button, a frog, a clip, a buckle, zipper, and a quick release buckle. In another embodiment, the at least one closing mechanism is a snap. In another embodiment, the at least one closing mechanism is a hook and loop (i.e. Velcro®). In another embodiment, the at least one closing mechanism is a clip. In another embodiment, the at least one closing mechanism is a quick release buckle. In another embodiment, the at least one closing mechanism is a zipper.

In another embodiment, the protective animal collar further comprises at least one loop attached to the top edge; wherein the loop is large enough to accommodate a standard pet collar. In another embodiment, the protective animal collar further comprises at least two loops attached to the top edge; wherein the loops are large enough to accommodate a standard pet collar. In another embodiment, the protective animal collar further comprises at least three loops attached to the top edge; wherein the loops are large enough to accommodate a standard pet collar. In another embodiment, the protective animal collar further comprises at least four loops attached to the top edge; wherein the loops are large enough to accommodate a standard pet collar. In another embodiment, the protective animal collar further comprises an edging extending from the top edge.

In another embodiment, the protective animal collar further comprises at least one support rib, wherein the support rib is at least half the length as measured from the top edge to the bottom edge; and wherein the support rib is essentially perpendicular to the top edge to the bottom edge. In another embodiment, the protective animal collar further comprises at least two support ribs, wherein the support ribs are at least half the length as measured from the top edge to the bottom edge; and wherein the support ribs are essentially perpendicular to the top edge to the bottom edge. In another embodiment, the protective animal collar further comprises at least three support ribs, wherein the support ribs are at least half the length as measured from the top edge to the bottom edge; and wherein the support ribs are essentially perpendicular to the top edge to the bottom edge. In another embodiment, the protective animal collar further comprises at least four support ribs, wherein the support ribs are at least half the length as measured from the top edge to the bottom edge; and wherein the support ribs are essentially perpendicular to the top edge and to the bottom edge. In another embodiment, the protective animal collar further comprises at least one support rib, wherein the support rib is essentially parallel to the top edge and to the bottom edge. In another embodiment, the protective animal collar further comprises at least two support ribs, wherein the support ribs are essentially parallel to the top edge and to the bottom edge. In another embodiment, the protective animal collar further comprises at least three support ribs, wherein the support ribs are essentially parallel to the top edge and to the bottom edge. In another embodiment, the protective animal collar further comprises at least four support ribs, wherein the support ribs are essentially parallel to the top edge and to the bottom edge. In another embodiment, the ribs are secured between layers in a multilayered panel. In another embodiment, the ribs are secured between the overlapping regions where the panels are attached.

In another embodiment, the protective animal collar further comprises a border material along the top edge, bottom edge, first end, and second end. In another embodiment, the border material is selected from the group consisting of nylon webbing, reflective tape, fusible edging, and bias tape. In another embodiment, the border material is nylon webbing. In another embodiment, the border material is reflective tape.

1. A protective animal collar comprising a fan-shaped multi-panel array comprising at least one first panel comprising at least one layer of a first material; at least one second panel comprising at least one layer of a second material; a top edge; a bottom edge; a first end; and a second end; and at least one closing mechanism; wherein the at least one first panel and at least one second panel are adjacent to each other; wherein the at least one first panel and the at least one second panel have a length that extends from the top edge to the bottom edge; wherein the first material is either transparent or non-transparent and the second material transparent; wherein the top edge is shorter than the bottom edge; wherein the closure attaches the first end to the second end; and wherein attachment of the first end to the second end forms a three dimensional frustoconical structure.

2. The protective animal collar of claim 1, further comprising at least two second panels.

3. The protective animal collar of claim 2, wherein the at least two second panels are separated by a first panel.

4. The protective animal collar of claim 2, wherein the at least two second panels are positioned to be on opposite sides when the first end and second end are attached.

5. The protective animal collar of claim 1, further comprising least three second panels.

6. The protective animal collar of claim 5, further comprising at least two first panels; wherein the at least two first panels separate the at least three second panels.

7. The protective animal collar of claim 6, wherein the at least three second panels are positioned such that two of the three panels are on opposite sides when the first end and second end are attached.

8. The protective animal collar of claim 1, wherein the first panel and second panel are in an alternate configuration.

9. The protective animal collar of any one of the previous claims, wherein the first panel further comprises at least two layers of the first material.

10. The protective animal collar of any one of the previous claims, wherein the first panel further comprises at least one layer of the first material and at least one layer of a third material.

11. The protective animal collar of any one of the previous claims, wherein the first material is selected from the group consisting of a canvas, a denim, un upholstery fabric, a synthetic fabrics, a composite fabric, a plastic, a rubber, a silicone, a reflective material, an arcel, a polyethylene, a polypro, a polypropylene, and a mesh.

12. The protective animal collar of any one of the previous claims, wherein the second material is selected from the group consisting of a plastic and a rubber.

13. The protective animal collar of any one of the previous claims, wherein the at least one first panel and the at least one second panel are glued together.

14. The protective animal collar of any one of the previous claims, wherein the at least one first panel and the at least one second panel are sewn together.

15. The protective animal collar of any one of the previous claims, wherein the at least one first panel and the at least one second panel are taped together.

16. The protective animal collar of any one of the previous claims, wherein the at least one first panel and the at least one second panel are high frequency welded together.

17. The protective animal collar of any one of the previous claims, wherein the at least one first panel and the at least one second panel are held together using a fastening mechanism.

18. The protective animal collar of claim 17, wherein the fastening mechanism is selected from the group consisting of a hook and loop, a snap, a zipper, and a hook and eye closure.

19. The protective animal collar of claim 1, further comprising multiple closing mechanisms; wherein the multiple closing mechanisms are arranged to allow for more than one size when assembled in the three dimensional frustoconical structure.

20. The protective animal collar of any one of the previous claims, wherein the at least one closing mechanism is selected from the group consisting of a hook and loop, a snap, a button, a frog, a clip, a buckle, zipper, and a quick release buckle.

21. The protective animal collar of claim 1, further comprising at least one loop attached to the top edge; wherein the loop is large enough to accommodate a standard pet collar.

22. The protective animal collar of claim 1, further comprising at least two loops attached to the top edge; wherein the loops are large enough to accommodate a standard pet collar.

23. The protective animal collar of claim 1, further comprising at least three loops attached to the top edge; wherein the loops are large enough to accommodate a standard pet collar.

24. The protective animal collar of claim 1, further comprising at least four loops attached to the top edge; wherein the loops are large enough to accommodate a standard pet collar.

25. The protective animal collar of claim 1, further comprising an edging extending from the top edge.

26. The protective animal collar of any one of claims 1 to 25, further comprising at least one support rib, wherein the support rib is at least half the length as measured from the top edge to the bottom edge; and wherein the support rib is essentially perpendicular to the top edge to the bottom edge.

27. The protective animal collar of any one of claims 1 to 25, further comprising at least two support ribs, wherein the support ribs are at least half the length as measured from the top edge to the bottom edge; and wherein the support ribs are essentially perpendicular to the top edge to the bottom edge.

28. The protective animal collar of any one of the claims 1 to 25, further comprising at least three support ribs, wherein the support ribs are at least half the length as measured from the top edge to the bottom edge; and wherein the support ribs are essentially perpendicular to the top edge to the bottom edge.

29. The protective animal collar of any one of the claims 1 to 25, further comprising at least four support ribs, wherein the support ribs are at least half the length as measured from the top edge to the bottom edge; and wherein the support ribs are essentially perpendicular to the top edge and to the bottom edge.

30. The protective animal collar of any one of claims 1 to 25, further comprising at least one support rib, wherein the support rib is essentially parallel to the top edge and to the bottom edge.

31. The protective animal collar of any one of claims 1 to 25, further comprising at least two support ribs, wherein the support ribs are essentially parallel to the top edge and to the bottom edge.

32. The protective animal collar of any one of claims 1 to 25, further comprising at least three support ribs, wherein the support ribs are essentially parallel to the top edge and to the bottom edge.

33. The protective animal collar of any one of claims 1 to 25, further comprising at least four support ribs, wherein the support ribs are essentially parallel to the top edge and to the bottom edge.

34. The protective animal collar of any one of the previous claims, further comprising a border material along the top edge, the bottom edge, the first end, and the second end.

35. The protective animal collar of claim 33, wherein the border material is selected from the group consisting of nylon webbing, reflective tape, fusible edging, and bias tape.

36. A method of restricting the ability of an animal to lick, bite, or scratch an area on its body, the method comprising the steps of wrapping the protective animal collar of any of the previous claims around the head and neck of an animal; and fastening the closing mechanism.

37. A method of controlling animal behavior comprising the steps of wrapping the protective animal collar of any of the previous claims around the head and neck of an animal; and fastening the closing mechanism.

The invention claimed is:

1. A protective animal collar comprising:
a fan-shaped multi-panel array having
at least one first panel comprising at least one layer of a first material;
at least one second panel comprising at least one layer of a second material;
a top edge;

a bottom edge;
a first end;
a second end; and
at least one closing mechanism, wherein
the at least one first panel and the at least one second panel are adjacent,
the at least one first panel and the at least one second panel extend from the top edge to the bottom edge,
the first material is either transparent or non-transparent and the second material is transparent,
the top edge is of a length less than a length of the bottom edge, and
the closing mechanism attaches the first end to the second end such that attaching the first end to the second end forms a three dimensional frustoconical structure.

2. The protective animal collar of claim 1, further comprising at least two second panels, wherein the at least two second panels are separated by the at least one first panel.

3. The protective animal collar of claim 1, further comprising at least two second panels, wherein the at least two second panels are adjacent when the closing mechanism attaches the first end to the second end.

4. The protective animal collar of claim 1, wherein the at least one first panel and the at least one second panel are in an alternate configuration.

5. The protective animal collar of claim 1, wherein the first material is at least one of a canvas, a denim, an upholstery fabric, a composite fabric, a synthetic fabric, a plastic, a rubber, a reflective material, a silicone, an arcel, a polyethylene, a polypro, a polypropylene and a mesh.

6. The protective animal collar of claim 5, wherein the at least one first panel comprises at least a first layer of the first material and a second layer of the first material, the first layer of the first material being a different first material than the second layer of the first material.

7. The protective animal collar of claim 1, wherein the second material is at least one of a transparent plastic, an arcel, a polyethylene, a polypro, a polypropylene and a rubber.

8. The protective animal collar of claim 1, wherein the at least one first panel and the at least one second panel are permanently attached by at least one of stitching, gluing, fusing and high frequency welding.

9. The protective animal collar of claim 1, wherein the at least one first panel and the at least one second panel are non-permanently attached by at least one of a hook and loop and removable double sided tape.

10. The protective animal collar of claim 1, wherein the closing mechanism is at least one of a hook and loop, a snap, a zipper, a frog, a clip, a button, a button buckle, a quick release buckle and a hook and eye closure.

11. The protective animal collar of claim 1, wherein the closing mechanism is adjustable and includes at least two attachment points such that the closing mechanism adjusts a size of the protective animal collar.

12. The protective animal collar of claim 1, wherein the top edge comprises at least one loop, a size of the loop being fixed or adjustable and accommodating a standard pet collar.

13. The protective animal collar of claim 12, wherein the loop is formed by two connectable strips, the two connectable strips being connected to each other by at least one of a snap, a hook and loop, a button and being tied together.

14. The protective animal collar of claim 12, wherein the loop is formed by a strip which connects to itself, the strip connecting to itself by at least one of a snap, a hook and loop and a button.

15. The protective animal collar of claim 1, further comprising a border extending along the first end, the top edge, the second end and the bottom edge, the border being at least one of a nylon webbing, a reflective tape, fusible edging and bias tape.

16. The protective animal collar of claim 1, wherein at least one of the at least first panel and the at least second panel comprises a support rib being at least one of a plastic, fiberglass and wood, the support rib positioned within at least one of a center of the at least one first panel, within a center of the at least one second panel and along a seam where the at least one first panel and the at least one second panel attach such that the support rib is perpendicular to the top edge and the bottom edge and is of a length which is at least half of a length as measured from the top edge to the bottom edge.

17. The protective animal collar of claim 1, wherein at least one of the at least first panel and the at least second panel comprises a support rib being at least one of a plastic, fiberglass and wood, the support rib positioned within at least one of a center of the at least one first panel, within a center of the at least one second panel and along the bottom edge such that the support rib is parallel to the top edge and the bottom edge and is of a width which is less than a width of the at least one first panel and a width of the at least one second panel.

18. The protective animal collar of claim 1, wherein a shape of the at least one first panel and the at least one second panel is trapezoidal.

19. The protective animal collar of claim 1, wherein at least one of the at least one layer of the first material and the at least one layer of the second material is configured to secure a support rib being at least one of a plastic, fiberglass and wood such that the support rib maintains a shape of the three dimensional frustoconical structure when the closing mechanism attaches the first end to the second end.

* * * * *

UNITED STATES PATENT AND TRADEMARK OFFICE
CERTIFICATE OF CORRECTION

PATENT NO.         : 9,585,365 B1
APPLICATION NO.    : 15/260808
DATED              : March 7, 2017
INVENTOR(S)        : Gibson et al.

Page 1 of 1

It is certified that error appears in the above-identified patent and that said Letters Patent is hereby corrected as shown below:

On the Title Page

Item (12) delete "Gibson" and insert --Gibson et al.--.

Item (72) Inventors, should read:
--(72) Inventors: Chad Gibson, Carlsbad, CA (US); Curtis Eugene Gibson, Carlsbad, CA (US); Jennifer Lee Barrelli, Carlsbad, CA (US)--.

Signed and Sealed this
Ninth Day of May, 2017

Michelle K. Lee
*Director of the United States Patent and Trademark Office*